US006585827B2

(12) United States Patent
Field et al.

(10) Patent No.: US 6,585,827 B2
(45) Date of Patent: Jul. 1, 2003

(54) APPARATUS AND METHOD OF USE FOR CLEANING A HARD FLOOR SURFACE UTILIZING AN AERATED CLEANING LIQUID

(75) Inventors: Bruce F. Field, Minneapolis, MN (US); Earl Krueger, Inver Grove Heights, MN (US); Bryan Christensen, Dayton, MN (US); James J. Seifert, Woodbury, MN (US); Michael Blehert, Minneapolis, MN (US)

(73) Assignee: Tennant Company, Minneapolis, MN (US)

( * ) Notice: Subject to any disclaimer, the term of this patent is extended or adjusted under 35 U.S.C. 154(b) by 0 days.

(21) Appl. No.: 10/026,411

(22) Filed: Dec. 21, 2001

(65) Prior Publication Data

US 2003/0019068 A1 Jan. 30, 2003

Related U.S. Application Data

(60) Provisional application No. 60/308,773, filed on Jul. 30, 2001.

(51) Int. Cl.[7] ................................................. B08B 7/00
(52) U.S. Cl. ............................ 134/6; 134/21; 134/25.4; 134/34; 134/40; 15/38; 15/49.1; 15/51; 15/53; 15/52; 15/52.1; 15/78; 15/97.1; 15/98; 15/320; 15/321; 15/322; 15/340.3; 15/340.4
(58) Field of Search .............................. 134/6, 21, 25.4, 134/34, 40; 15/38, 49.1, 50.1, 50.3, 51, 52, 52.1, 78, 97.1, 98, 320, 321, 322, 340.3, 340.4

(56) References Cited

U.S. PATENT DOCUMENTS

| 2,731,659 | A |   | 1/1956  | Coplen |
|-----------|---|---|---------|--------|
| 3,212,762 | A |   | 10/1965 | Carroll et al. |
| 3,392,418 | A |   | 7/1968  | Schowalter |
| 3,453,678 | A |   | 7/1969  | Gehman et al. ............... 15/50 |
| 3,655,096 | A | * | 4/1972  | Easter .......................... 206/222 |
| 3,676,889 | A |   | 7/1972  | Edlin ........................... 15/320 |
| 3,761,987 | A |   | 10/1973 | Nayfa et al. .................... 15/50 |
| 3,774,262 | A |   | 11/1973 | Anthony et al. .............. 15/322 |

(List continued on next page.)

FOREIGN PATENT DOCUMENTS

| DE | 44 13 783 A1 | 3/1995 |
|----|--------------|--------|
| DE | WO 02/05047  | 1/2002 |
| JP | 11216092     | 8/1999 |
| WO | WO 95/09557  | 4/1995 |
| WO | WO 00/35333  | 6/2000 |
| WO | WO 02/06435  | 1/2002 |

OTHER PUBLICATIONS

Discover Magazine, Jun. 2002, "Does the Universe Exist if We Don't Observe It?", including cover, Table of Contents, and pp. 26 and 27.

Primary Examiner—Randy Gulakowski
Assistant Examiner—Mikhail Kornakov
(74) Attorney, Agent, or Firm—Westman, Champlin & Kelly (57) ABSTRACT

A method of cleaning a hard floor surface with a surface maintenance vehicle including the steps of generating a foam-like aerated cleaning liquid, selectively conveying the foam-like aerated cleaning liquid to the hard floor surface and a scrubbing medium operatively coupled to the surface maintenance vehicle, scrubbing the hard floor surface with said rotating scrubbing medium and said foam-like aerated cleaning liquid so as to loosen soil from the hard floor surface leaving behind a soiled solution of cleaning liquid and soil, and removing at least a portion of the soiled solution from the hard floor surface through a fluid recovery device. Additional aspects of the present invention include devices for performing the cleaning method.

36 Claims, 8 Drawing Sheets

U.S. PATENT DOCUMENTS

| | | | | |
|---|---|---|---|---|
| 3,789,449 A | * | 2/1974 | MacFarland et al. | 15/4 |
| 3,931,662 A | | 1/1976 | Nayfa et al. | 15/320 |
| 3,940,826 A | | 3/1976 | Phillips et al. | 15/320 |
| 4,000,536 A | | 1/1977 | Nayfa et al. | 15/50 |
| 4,061,001 A | | 12/1977 | von der Eltz et al. | 68/200 |
| 4,107,075 A | | 8/1978 | Kramer | 252/359 |
| 4,167,798 A | | 9/1979 | Kiigl et al. | 15/320 |
| 4,167,799 A | | 9/1979 | Webb | 15/320 |
| 4,191,590 A | * | 3/1980 | Sundheim | 134/102.1 |
| 4,369,544 A | | 1/1983 | Parisi | 15/320 |
| 4,429,432 A | | 2/1984 | Copeland et al. | 15/320 |
| 4,570,856 A | * | 2/1986 | Groth et al. | 137/607 |
| 4,595,420 A | | 6/1986 | Williams, III et al. | 134/6 |
| 4,667,364 A | | 5/1987 | Meili | 15/320 |
| 4,780,243 A | | 10/1988 | Edgley et al. | 252/307 |
| 4,881,288 A | | 11/1989 | May et al. | 15/98 |
| 4,974,618 A | | 12/1990 | Nysted | 134/21 |
| 5,031,837 A | | 7/1991 | Hanish | 239/267 |
| 5,060,342 A | * | 10/1991 | Brazier | 15/322 |
| 5,133,107 A | | 7/1992 | MacDonald | 15/50.3 |
| 5,813,086 A | | 9/1998 | Ueno et al. | 15/320 |
| 5,853,814 A | | 12/1998 | Murphy | 427/434.6 |
| 6,276,613 B1 | | 8/2001 | Kramer | 239/304 |
| 6,418,586 B2 | | 7/2002 | Fulghum | 15/320 |

* cited by examiner

APPARATUS AND METHOD OF USE FOR CLEANING A HARD FLOOR SURFACE UTILIZING AN AERATED CLEANING LIQUID

RELATED APPLICATION

This application hereby incorporates by reference and, under 35 U.S.C. §119(e), claims the benefit of priority of U.S. Provisional Patent Application Ser. No. 60/308,773 filed Jul. 30, 2001.

FIELD OF THE INVENTION

The present invention relates generally to surface maintenance or conditioning machines, and more particularly to those machines employing one or more surface maintenance or conditioning appliances or tools to perform a hard floor surface wet scrubbing task.

BACKGROUND OF THE INVENTION

Hard floor surface scrubbing machines are widely used to clean the floors of industrial and commercial buildings. They range in size from a small model which may clean a path ranging from 15 inches up to 36 inches wide controlled by an operator walking behind it, to a large model cleaning a path as wide as five feet controlled by an operator riding on the machine. Such machines in general are wheeled vehicles with suitable operator controls. Their bodies contain power and drive means, a solution tank to hold a cleaning liquid and a recovery tank to hold soiled solution recovered from the floor being scrubbed. The cleaning liquid may be water and a chemical detergent. The detergent typically includes a solvent, builder, and surfactant. Builders and surfactants provide for foam generation and foam stability. A scrub head which contains one or more scrubbing brushes and associated drive means are attached to the vehicle and may be located in front of, under or behind it. A solution distribution system dispenses cleaning liquid from the solution tank to the floor in the vicinity of the scrubbing brush or brushes. For a typical scrubber with a 32 inch wide scrub swath, the solution distribution rate varies between 0.5 gallons per minute (GPM) to 1.0 GPM.

Hard floor surface scrubbing machines typically further include a system to recover soiled scrubbing solution from the floor after it has been scrubbed. A solution recovery system may be a vacuum system including, for example, a double lipped vacuumized squeegee that wipes the floor behind the scrub head and collects the soiled scrubbing solution of water, detergent and soilage that has been loosened from the floor. The soiled scrubbing solution may include foam or froth generated by mechanical action of the brushes against the cleaning solution and the hard floor surface. Additional amounts of foam may be generated through the vacuum recovery process. Foam (air expanded cleaning solution) has heretofore been a shortcoming of prior art scrubbers as foam occupies a significantly greater volume as compared to the volume of unexpanded cleaning solution. Excessive foam within the recovery tank can necessitate shutting down the machine and emptying the recovery tank before the solution tank is empty, which reduces the productivity of the machine. As a result, foam elimination or reduction techniques have included specifically adapted enlarged solution recovery tanks and the addition of defoaming chemicals to the recovered solution tank.

Other limitations of vacuum systems for soiled solution recovery include power requirements, noise generation, and reliability. An alternative to vacuum-based soiled solution recovery systems for use upon a hard floor surface scrubbing machine would be desired.

One limitation of prior art scrubbers has been a relatively limited operational run time. For a typical scrubber with a 32 inch wide scrub swath and 30 gallon solution tank, the solution distribution rate varies between 0.5 GPM to 1.0 GPM. Run time based on solution capacity is between approximately 30 to 40 minutes. Merely increasing the size of the cleaning solution tanks is not a viable solution to achieving increased machine run times. An increase in cleaning solution capacity typically necessitates modifications to the frame and motive components, all of which result in additional weight and energy requirements for such a device. To the contrary, a need exists for a device having an increased run time achieved by reducing the amount of water required for the scrubbing process.

Another aspect of prior art scrubbers is the inefficient use of cleaning liquid in the scrub process. A relatively large amount of cleaning liquid is utilized to ensure wetting of the floor surface. The scrub process generates a relatively large amount of soiled cleaning liquid, most of which is recovered by the scrubber. Disposal of soiled solution in some applications remains an issue, especially where the cleaning process removes harmful or hazardous chemicals. Special handling or additional costs may be incurred to properly dispose a particularly soiled solution. By reducing the amount of water needed to perform a scrubbing process, a concomitant reduction in the amount of soiled solution is achieved. A need exists for a cleaning process providing efficient usage of cleaning solution.

The prior art discloses devices for cleaning surfaces, namely carpets, utilizing foam generation systems and mechanical brushes. These devices have utilized a variety of foam generation systems and recovery systems. Examples of such foam cleaning devices include U.S. Pat. Nos. 3,761,987; 3,931,662; and 5,813,086.

Nayfa et al (U.S. Pat. Nos. 3,761,987 and 3,931,662) discloses a machine for scrubbing or shampooing rugs or carpeted floor surfaces, for scrubbing hard floor surfaces, or for waxing and polishing hard floor surfaces. Stated objects of the invention of Nayfa et al. include:

- an improved floor surface cleaning machine having the capability to shampoo and remove surface dirt from a carpet surface in one operation, to scrub and remove surface dirt from a hard floor surface in one operation, or to apply wax to and polish a floor surface in one operation,
- a floor surface cleaning machine having a cleaning solution foaming system within the machine and a pressurized foam dispensing system,
- a rug cleaning machine having means for scrubbing the pile, removing the dirt from the pile, and lifting the pile to original position in one operation,
- a rug cleaning machine wherein the machine support and drive rollers function as squeegies to direct the cleaning foam and entrapped dirt toward the vacuum pickup nozzles, and
- a floor surface cleaning machine having an improved solution dispensing mechanism including means for forming a foam, means for effecting flow of the foam under pressure, and means for controlling the rate of flow of foam to the floor surface.

These devices have not addressed limitations of prior art floor scrubbers, such as efficient cleaning solution usage in a hard floor surface scrubbing process.

SUMMARY AND OBJECTS OF THE INVENTION

Briefly stated, an improved hard floor surface scrubbing machine according to the present invention includes an aerator for generating a foam-like aerated cleaning liquid, one or more scrub brushes for engaging aerated cleaning liquid and the hard floor surface, and a soiled solution recovery system for removing soiled solution from the hard floor surface. A variety of liquid aerators may be utilized to practice the present invention. A particularly preferred aerator includes a pressurized air source, a pressurized cleaning liquid source, and a plurality of mixing elements for generating the aerated cleaning liquid. Alternative soiled solution recovery systems may be utilized in embodiments of the present invention.

An object of the present invention is to overcome the drawbacks of the conventional technology and to provide an efficient hard floor surface scrubbing machine.

Another object of the present invention is to provide a hard floor surface scrubbing machine which utilizes a foamed cleaning liquid in an efficient scrubbing process. The cleaning liquid may be water and a chemical surfactant. The aerated cleaning liquid may be generated via a variety of known aeration devices or systems. The aerated cleaning liquid permits a substantial reduction in the amount of cleaning solution liquid required in a scrub cleaning process. The reduction of cleaning liquid requirements may translate into decreased machine size and/or increased machine run times. Additionally, the amount of soiled cleaning solution which may require special disposal or additional handling may be reduced.

An aspect of the present invention is the provision of a cleaning liquid which can be efficiently aerated via known aeration devices, applied to a surface during a scrubbing process, and be rapidly dearated prior to a soiled solution recovery process.

Another aspect of the present invention is the provision of a cleaning liquid which may be efficiently aerated to a foam-like consistency, applied to the floor surface, and quickly dearated by engagement with a scrub brush. In a preferred embodiment of the present invention, the foam-like aerated cleaning liquid is substantially dearated by the scrub brush prior to soiled solution recovery.

Another aspect of the present invention is the provision of a defoaming device for de-aerated foamed soiled solution recovered during machine operation. The defoaming device may include a chemical-based defoamant, or may include a radiant heating element to thermally deaerate the recovered foam.

Another aspect of the present invention is to provide a chemical dosing or metering system for combining a chemical with water to create a cleaning liquid during operation of the machine. In one embodiment of the invention, a machine may have a clean water tank and a chemical dosing system for combining water and a chemical prior to aeration. The chemical dosing system may include a configured removable chemical cartridge adapted to engage a correspondingly configured portion of the cleaning machine. The chemical dosing system may include active or passive elements for combining a chemical with water to create the cleaning liquid.

Yet another aspect of the present invention is a process for cleaning hard floor surfaces including the steps of aerating a cleaning liquid to form an aerated cleaning liquid, selectively conveying the aerated cleaning liquid to the hard floor surface and a rotating scrub brush, engaging the hard floor surface and the aerated cleaning liquid with the rotating scrub brush to loosen soil from the hard floor surface and to create a soiled solution of cleaning liquid and soil, and removing at least a portion of the soiled solution from the hard floor surface through the fluid recovery system.

DETAILED DESCRIPTION OF THE INVENTION

Figure 1:
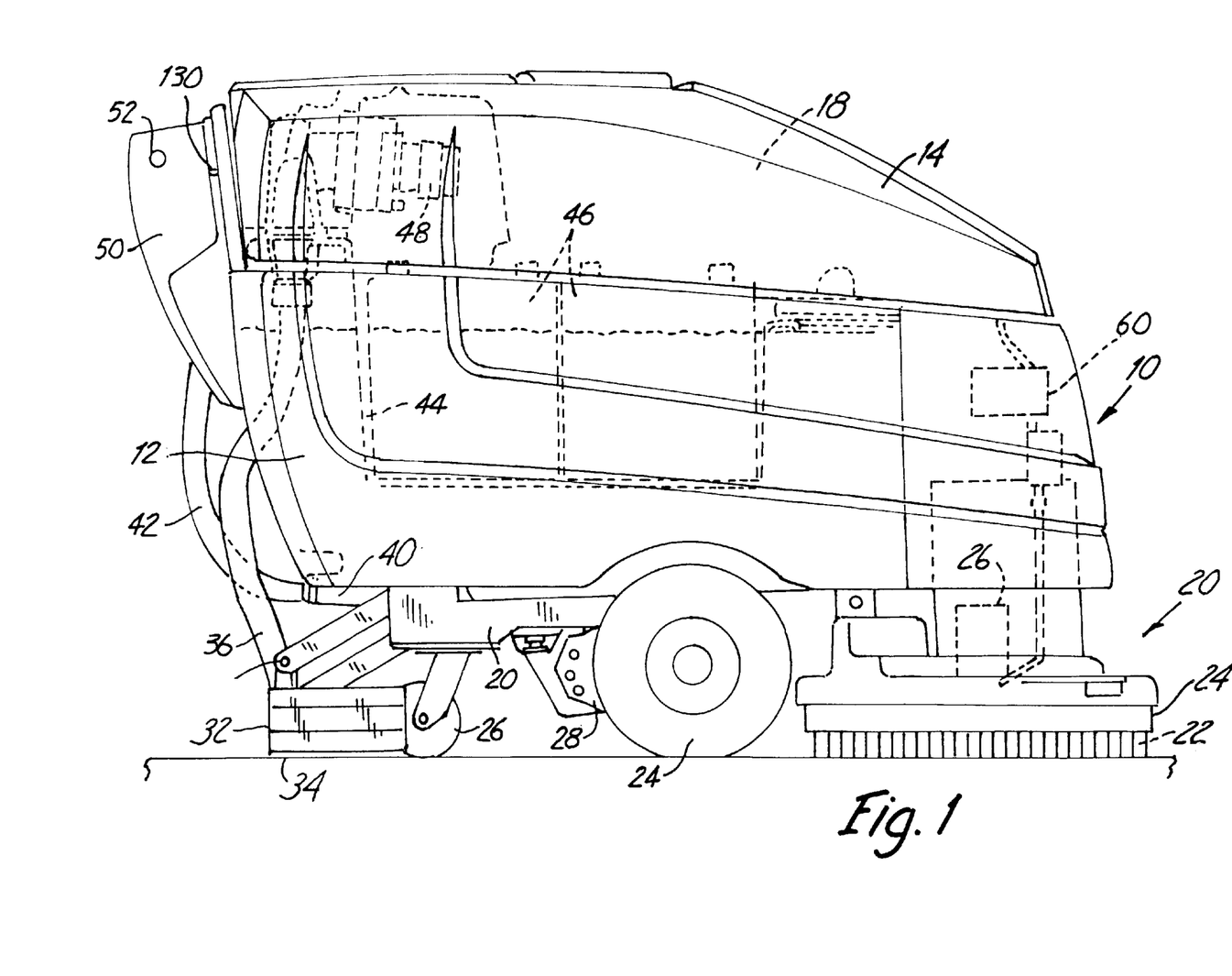
FIG. 1 is a side elevation view of the scrubber of the present invention.
Figure 2:
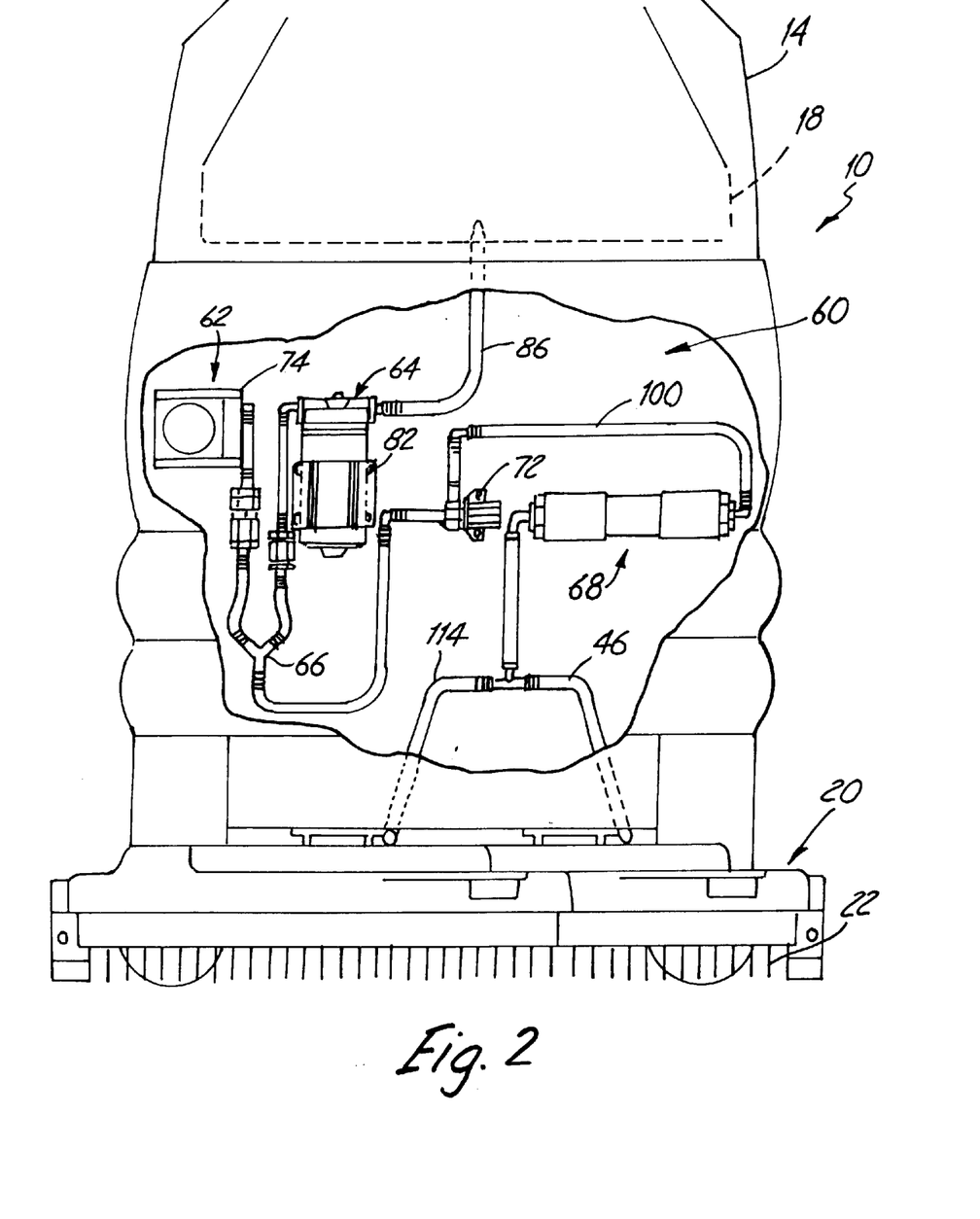
FIG. 2 is a front elevation view of the scrubber of FIG. 1.

FIG. 1 illustrates an embodiment of a surface maintenance vehicle according to the present invention. The illustrated surface maintenance vehicle is a walk-behind scrubber machine 10 utilized to clean hard floor surfaces, such as concrete, tile, vinyl, terrazzo, etc. In alternative embodiments, the surface maintenance vehicle may be a ride-on or towed-behind vehicle performing a scrubbing operation as described herein. The surface maintenance vehicle may be powered through an on-board power source, such as batteries or an IC engine, or though an electrical cord. In the embodiment of FIG. 1, the scrubber 10 includes a recovery tank 12, a lid 14 and a front cover 16. The lid 14 is attached along one side of the recovery tank by hinges (not shown) so the lid 14 can be pivoted up to provide access to the interior of the tank 12. The lid 14 defines a cleaning solution tank 18 for containing a cleaning liquid, such as a mixture of water and a cleaning chemical to be conditioned, applied to the hard floor surface, and recovered from the floor surface as further described herein.

A scrub head 20 includes a scrubbing medium 22, shrouds 24, and a scrubbing medium drive 26. The scrubbing medium 22 may be one or more brushes. In the illustrated embodiment, a pair of brushes 22 define the scrubbing medium. The brushes 22 may include bristle brushes, pad scrubbers, or other hard floor surface engaging devices for scrubbing. The term "brush" as used herein is not limited to bristle devices, but is intended to cover a variety of known hard floor surface scrubbing elements. One or more electric motor brush drives 26 may be utilized to rotate the brushes 22. The scrubbing medium may be a disk-type scrub brush rotating about a generally vertical axis of rotation relative to the hard floor surface. The scrubbing medium may also be a cylindrical-type scrub brush rotating about a generally horizontal axis of rotation relative to the hard floor surface. Alternative embodiments of the present invention may include scrub brushes 22 being oscillated rather than rotated into contact with the hard floor surface. A variety of brush rotation and/or oscillation devices would be appreciated by those skilled in the relevant arts. In the illustrated embodiment, a pair of rotating disk brushes 22 are utilized. The scrub head 20 is attached to the machine 10 such that the scrub head 20 can be moved between a lowered working position and a raised traveling position.

A machine frame supports the recovery tank 18 on wheels 24 and casters 26. Further details of the frame are shown and described in U.S. Pat. No. 5,611,105 the disclosure of which is incorporated herein by reference. Wheels 24 are preferably driven by a motor and transaxle assembly shown schematically at 28. The rear of the frame carries a linkage 30 to which a fluid recovery device 32 is attached. In the embodiment of FIG. 1, the fluid recovery device 32 includes a vacuum squeegee 34 in vacuum communication with an inlet chamber in the recovery tank 12 through a hose 36. The bottom of the inlet chamber is provided with a drain 40 with a drain hose 42 connected to it. An alternative non-vacuumized fluid recovery device 32 is described in more detail herein with particular reference to FIG. 5.

The vehicle body incorporates a battery compartment 44 in which batteries 46 reside. The batteries 46 provide power to the drive motors 26, scrub head 20, and a vacuum fan 48. The vacuum fan 48 is mounted in the lid 14. A control unit 50 mounted on the rear of the body includes steering control handles 52 and the necessary operating controls and gauges for the scrubber. Additional aspects of automatic scrubber machines are disclosed in U.S. Pat. Nos. 5,483,718; 5,515,568; and 5,566,422, each incorporated by reference herein. Alternative motive systems such as an IC engine system may be utilized in another embodiment of the present invention.

In a preferred embodiment of the present invention the cleaning liquid includes water and a chemical surfactant. Alternative cleaning liquids may also be utilized in other embodiments of the present invention. Alternative cleaning liquids may be water or chemical based. Alternative cleaning liquids may include one or more surfactants, builders, solvents, or other components. A particularly preferred surfactant is DeTERIC CP-Na-38 manufactured by DeForest Enterprises, Inc. of Boca Raton, Fla. A particularly preferred surfactant concentration of the cleaning liquid is approximately 0.1%. In a preferred embodiment, no additional solvents or builders are utilized. As described in more detail hereinafter, the cleaning liquid is aerated to create a foam/water mix which is delivered to the hard floor surface and utilized in a scrubbing process. The foam-like aerated cleaning liquid facilitates an efficient wetting of the floor surface. As described in more detail herein, one benefit of the preferred surfactant is the ability to efficiently aerate the cleaning liquid into a foam, apply the foamed cleaning liquid to the hard floor surface, work the foamed cleaning liquid with the scrub brushes, and substantially deaerate the foamed cleaning liquid prior to soiled solution recover. In operation, dearation of the aerated cleaning liquid is rapidly achieved via brush 22 contact. As a result, relatively little foam is transferred into the recovery tank 12. One skilled in the relevant arts will appreciate that alternative surfactants may also be practicable. As a result, the identification of a particular surfactant herein is not intended to be limiting. Additionally, detergents including a surfactant along with other solvents, builders, or other components may be practicable for an application of the present invention.

The cleaning liquid may be contained within solution tank 18 as a mixture of water and the surfactant. The surfactant may be added to water within the solution tank 18 to achieve a predetermined concentration within the solution tank 18. For example, a predetermined amount of surfactant may be added to a predetermined amount of water, such as during a refilling operation. Alternatively, the mixture of water and surfactant may be achieved during machine operation through a chemical dispenser. Additional aspects of such dispensers are described hereinafter with reference to FIG. 7 and FIG. 8.

Referring to FIGS. 1–4, a cleaning liquid aerator for generating a foam-like aerated cleaning liquid for application to the hard floor surface during a scrubbing process according to the present invention is generally indicated at 60. The aerator 60 may include a variety of known foam generation devices, including but not limited to pressurized air and/or pressurized liquid systems, agitation systems, etc. A particularly preferred aerator 60 is disposed on the housing above the scrubbing head 20 and includes an air system 62 for pressurizing air, a liquid cleaning solution system 64 for pressurizing cleaning liquid, a first mixing element 66 for receiving pressurized air and pressurized liquid cleaning solution, a second mixing element 68 for further mixing in fluid communication with the first mixing element 66. A foam dispensing system 70 distributes foam generated by the mixing elements 66,68. An electric solenoid valve 72 is provided to control the flow of foam from the aerator 60.

Figure 3:
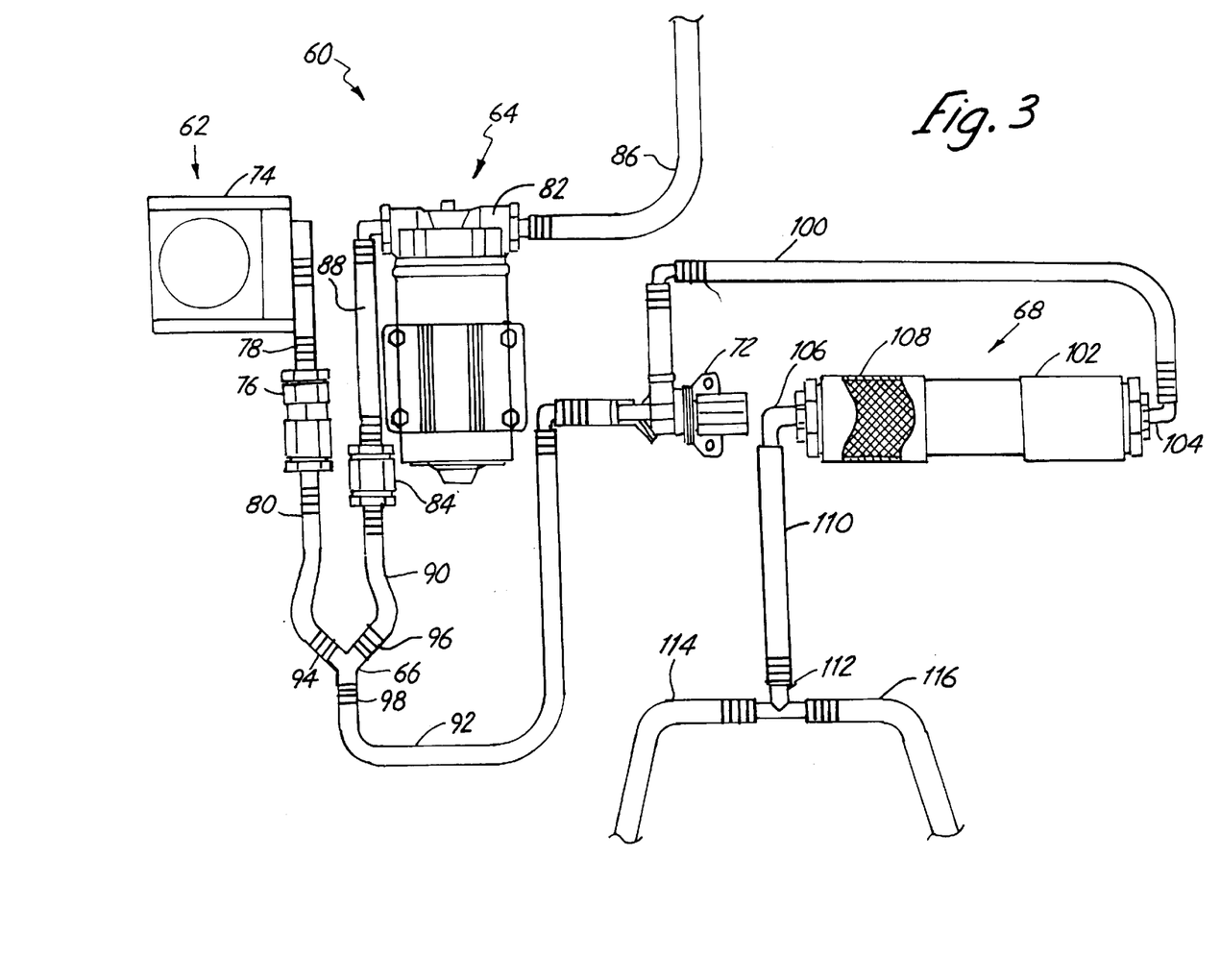
FIG. 3 is a detailed front elevation view of a cleaning liquid aeration system according to the present invention.

Referring particularly to FIG. 3, additional aspects of the cleaning liquid aerator 60 will be described. The air system 62 for generating and conveying pressurized air includes an air pump 74, a check valve 76, and associated fluid conduits 78, 80. In a particularly preferred embodiment of the machine, the air pump is a piston pump model number 22D1180-206-1002 manufactured by Gast Manufacturing, Inc., of Benton Harbor, Mich. Other types of air pumps may also be practicable in alternative foam systems, including but not limited to different piston, diaphragm or rotary vane pumps. Check valve 76 is provided for back flow prevention of cleaning solution into the air pump 74. A measured pressure at the air pump output during operation is approximately 40 pounds per square inch (psi).

The system for generating and conveying pressurized cleaning liquid includes a diaphragm pump 82, a metering orifice 84, and associated fluid conduits 86, 88, 90. The diaphragm pump 82 receives cleaning liquid from tank 18 via conduit 86. In a particularly preferred embodiment of the machine, the diaphragm pump is model number 8006-543-250 manufactured by Shur Flo, of Garden Grove, Calif. Pump 82 output is conducted via conduit 88 to metering orifice 84. In one preferred embodiment, metering orifice 84 size is 0.0030 inch. Flow rate through the metering orifice 84 during operation is approximately 0.2 gallons per minute. Output from metering orifice 84 is conducted to the first mixing element 66 via conduit 90.

The first mixing element 66 receives pressurized air from the air pump 74 via conduit 80 and pressurized cleaning solution from the solution pump 82 via conduit 90 and discharges a mixture of pressurized air and cleaning liquid through an outlet port 98. The first mixing element 66, in this embodiment a Y coupling, has a pair of inlet ports 94, 96 and an outlet port 98 through which the mixture is discharged. First mixing element 66 may be alternatively configured, though defining at least a pair of inlet ports for pressurized air and pressurized cleaning liquid and an outlet port for the mixture. First mixing element 66 may be defined as a passive mixing element. An alternative first mixing element may include active mixing devices, such as energized impeller.

The outlet port 98 of the first mixing element 66 is coupled to the electric solenoid valve 72 via conduit 92.

Valve 72 controls the flow of mixture to the second mixing element 68 via conduit 100. Valve 72 is operable between an open position in which solution is permitted to flow out of the first mixing element 66 and a closed position in which solution flow is blocked. Alternative valves may be used to control the flow of mixture within the system, including but not limited to variable output valves, etc.

The second mixing element 68 receives and further mixes the pressurized air and cleaning liquid from the first mixing element 66. Second mixing element 68 is a passive element including a relatively rigid receiver 102 having an inlet port 104 and an outlet port 106. A diffusion medium 108 is contained within the receiver 102. The diffusion medium 108 is capable of producing foam by shearing action, air entrainment or a combination of both. In a preferred embodiment, the diffusion medium 108 includes a plurality of SCOTCH-BRITE brand copper pads, manufactured by Minnesota Mining and Manufacturing Company of St. Paul, Minn. Alternative diffusion medium may also be practicable, including but not limited to glass beads, foams, and other porous substrates.

The length and diameter of the receiver 102 as well as structure of the diffusion medium 108, are sized so as to maintain the operating pressure of the foaming system 60 at a desired level. For the embodiment of FIGS. 2–4, the operating pressure within air conduit 78 is about 40 psi. The diffusion medium 108 and receiver 102 size affect the quality of the foam generated in the second mixing element 68. More particularly, using coarser diffusion medium 108 allows for easier passage of the foam through the receiver 102 since there are fewer contact, or blocking, points between medium 108 in the receiver 102. However, the coarser diffusion medium also results in larger foam bubbles. By using a sufficiently long receiver 102 with an appropriate diffusion medium 108, large foam bubbles formed near the upstream end of the receiver 102 will break down into more desirable smaller bubbles prior to reaching the downstream end of the receiver 102. As an example, the receiver 102 of the illustrated embodiment is about 9 inches long and has an inner diameter of approximately 2 inches. The receiver 102 may be provided at an incline relative to the ground surface so that inlet port 104 is at a slightly lower elevation than outlet port 106. By so providing the inlet port 104 above the outlet port, the amount of aerated cleaning liquid delivered to the scrub brushes 22 after the solenoid valve 72 has closed may be minimized. Various modifications and adaptations to the aerator 60 may be practicable.

Figure 4:
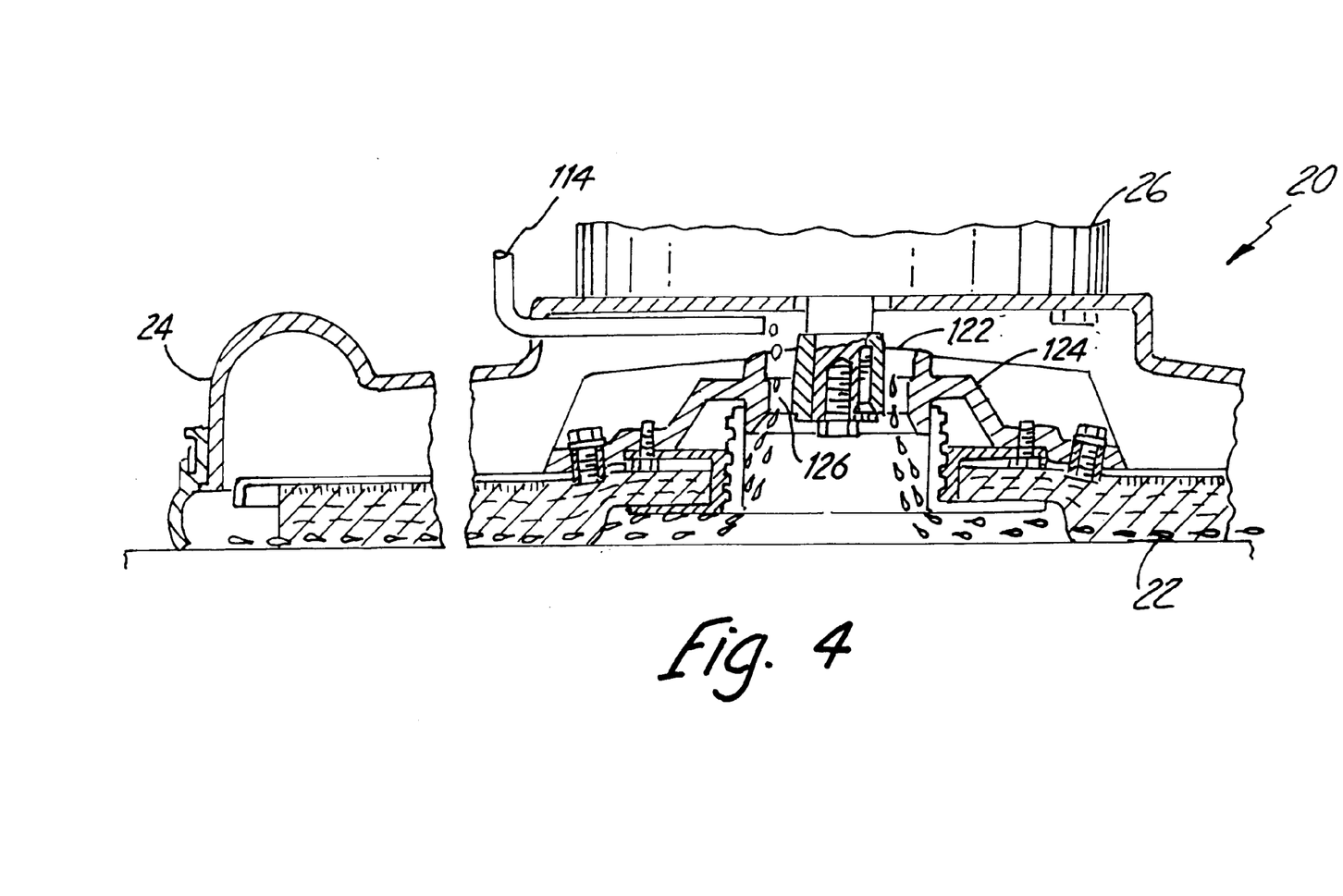
FIG. 4 is a detailed front elevation view of a portion of a scrubber according to the present invention.

A foamed solution of aerated cleaning liquid is discharged from the second mixing element 68 and directed toward the scrub head 20 via conduit 110. Flow within conduit 110 is separated by a T coupling 112 into conduits 114 and 116. The outlet of conduits 114, 116 are provided above associated disk brushes 22. As illustrated in FIG. 4, flow from conduit 114 can exit near the center of the scrub brushes 22 to deliver cleaning fluid into an annular trough 122 in the pad driver hub 124. The outlet of conduit 116 (FIG. 2) is also preferably similarly positioned near the center of scrub brushes 22. A series of holes 126 in the bottom of trough 122 pass the aerated cleaning liquid down to the central region of the cleaning brush 22. During operation, the cleaning liquid is centrifuged out under the brush 22 in contact with the hard floor surface. Alternative approaches to aerated cleaning liquid delivery would be appreciated by those skilled in the relevant arts.

A foam control switch 130 is electrically connected to the air compressor 62, cleaning liquid pump 82, and solenoid valve 72 for controlling operation of the foam aerator system 60. The foam control switch 130 may include a manual switch mounted on the control panel.

In operation, electrical current flows to the air compressor 62, fluid pump 82, and electric solenoid valve 72. Pressurized air is directed through conduit 78, check valve 76, and conduit 80. Pressurized cleaning solution is directed through conduit 88, metering orifice 84, and conduit 90. Pressurized air and cleaning solution is received into the first mixing element 66 and directed via conduit 92 through the control valve 72, and then through conduit 100 and into the second mixing element 68. As the mixture of air and cleaning solution flows through the diffusion medium 108 of the second mixing element 68, foam bubbles are generated. Foam output from the second mixing element 68 is discharged via conduits 110, 114, 116 to the scrub brushes 22. In a particular embodiment, the ratio of volumes between the unaerated cleaning liquid and foamed cleaning liquid is approximately 1:8, e.g., 0.15 gallons of cleaning liquid is aerated to occupy 1.25 gallons. Other volume ratios would yield acceptable scrubbing results. A foams "dryness" may be defined in relation to this volumetric expansion ratio. A "dry" foam having a higher expansion ratio as compared to a "wet" foam. High-expansion foams used in presently available types of carpet cleaning machines are actually relatively "dry" as the ratio of air to water is particularly high. Dry foams are used in carpet cleaning to facilitate quick drying of the cleaned carpet. A "wet" foam is not typically used in carpet cleaning devices as these foams can cause excessive wetting of the carpet which may lead long drying times and mold development.

The cleaning machine 10 is then moved forward, with the foam-like aerated cleaning liquid being dispensed from the conduits 114, 116 at the front of the chassis. As the cleaning machine 10 moves forward, the brushes 22 engage the aerated cleaning liquid and hard floor surface. The foamed cleaning liquid permits an efficient wetting of the hard floor surface, even at dramatically reduced cleaning solution usage. For example, cleaning liquid rates of 0.2 gallons per minute have yielded acceptable results. In comparison, prior art scrubbing machines of similar size often utilize approximately 1 gallon per minute. The process of mechanically working the foam with the brushes 22 results in substantial defoaming or de-aeration (up to 95% reduction in volume) of the foamed cleaning solution prior to soiled solution recovery. In contrast, prior art devices using known chemical detergents may create additional foam by the brush action, necessitating defoaming devices as mentioned herein.

In operation, a soiled solution of cleaning liquid and soil is developed by the interaction of the scrubbing medium in contact with the foamed cleaning liquid and the hard floor surface. The soiled solution includes partially deaerated cleaning liquid and soil released from the hard floor surface. The soiled solution is recovered from the hard floor surface through vacuum squeegee 34 and conveyed to the recovery tank 12 through hose 36. Alternative soiled solution recovery devices may also be practicable. The recovered soiled solution may be treated to reduce foam via known defoaming techniques, including an addition of defoaming chemical to the recovery tank 12. In the embodiment described herein, the soiled solution is substantially defoamed during the scrubbing process. The above referenced particular surfactant beneficially yields a foamed cleaning solution which rapidly de-aerates after contact with the rotating scrub brushes 22. As a result, in a preferred embodiment no additional defoaming devices or chemicals are required.

Figure 5:
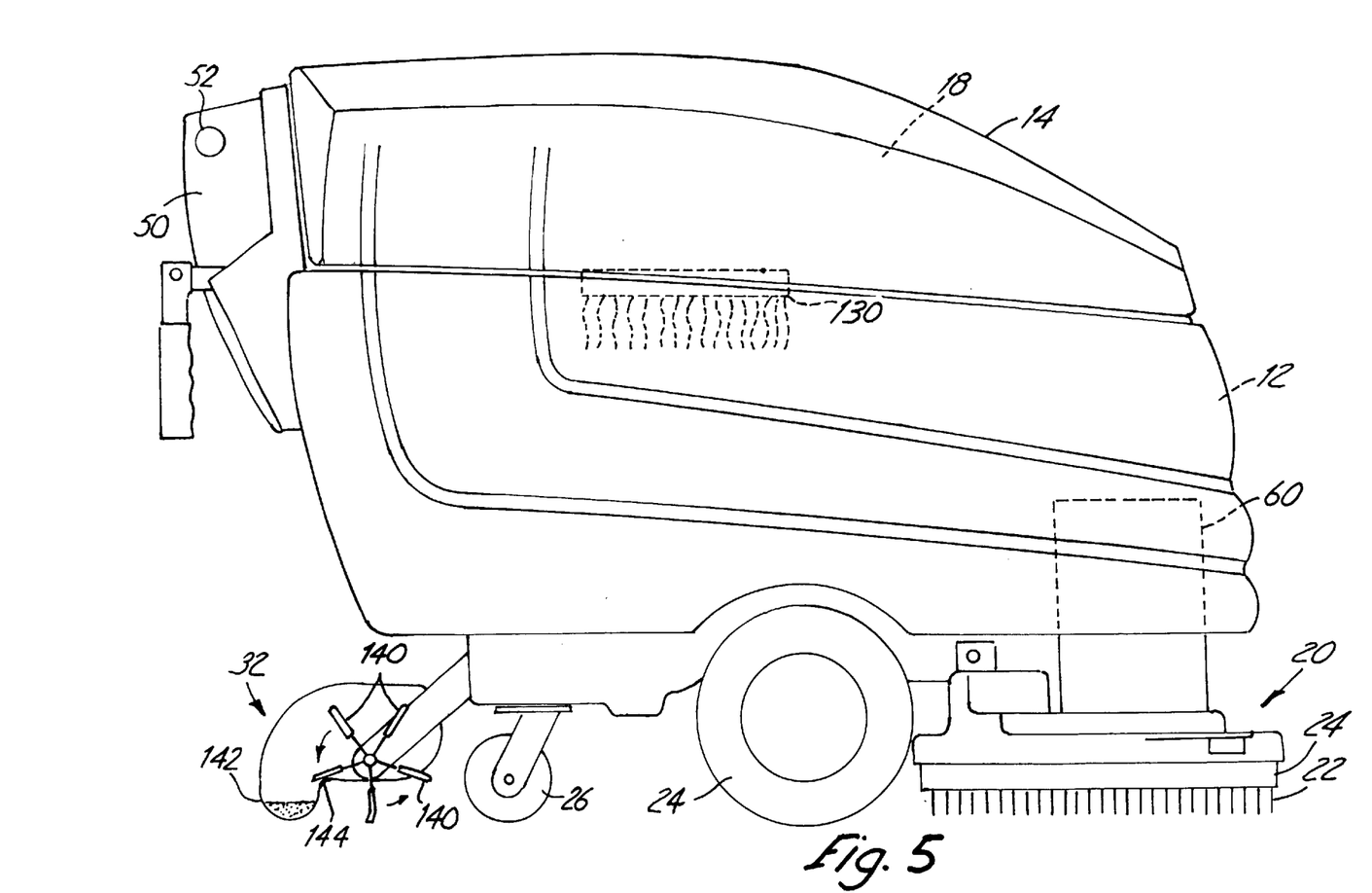
FIG. 5 is a side elevation view of another embodiment of a scrubber of the present invention.

FIG. 5 illustrates a scrubber utilizing an alternative soiled solution recovery device 32. The soiled solution recovery device 32 may include a non-vacuumized mechanical device for lifting the soiled solution away from the floor surface and conveying the soiled solution toward a collection tank or receptacle 142. In the embodiment of FIG. 5 the soiled solution recovery device includes a plurality of wiping medium such as pliable material elements 140 which are rotated into contact with the floor surface to engage and lift the soiled solution from the floor surface. The pliable material elements 140 may be of an absorbent material. The pliable material elements 140 convey the solution to the collection receptacle 142. Solution captured on the pliable elements 140 may be removed via a mechanical action, such as through a shearing device or a squeezing device. In the embodiment of FIG. 5, the mechanical action used to remove soiled solution from the pliable material elements 140 is a scraper bar 144 which engages the pliable material elements 140 to release the soiled solution. Alternative mechanical devices, structures, or systems may be used to convey the soiled solution from the floor surface toward a collection receptacle.

Figure 6:
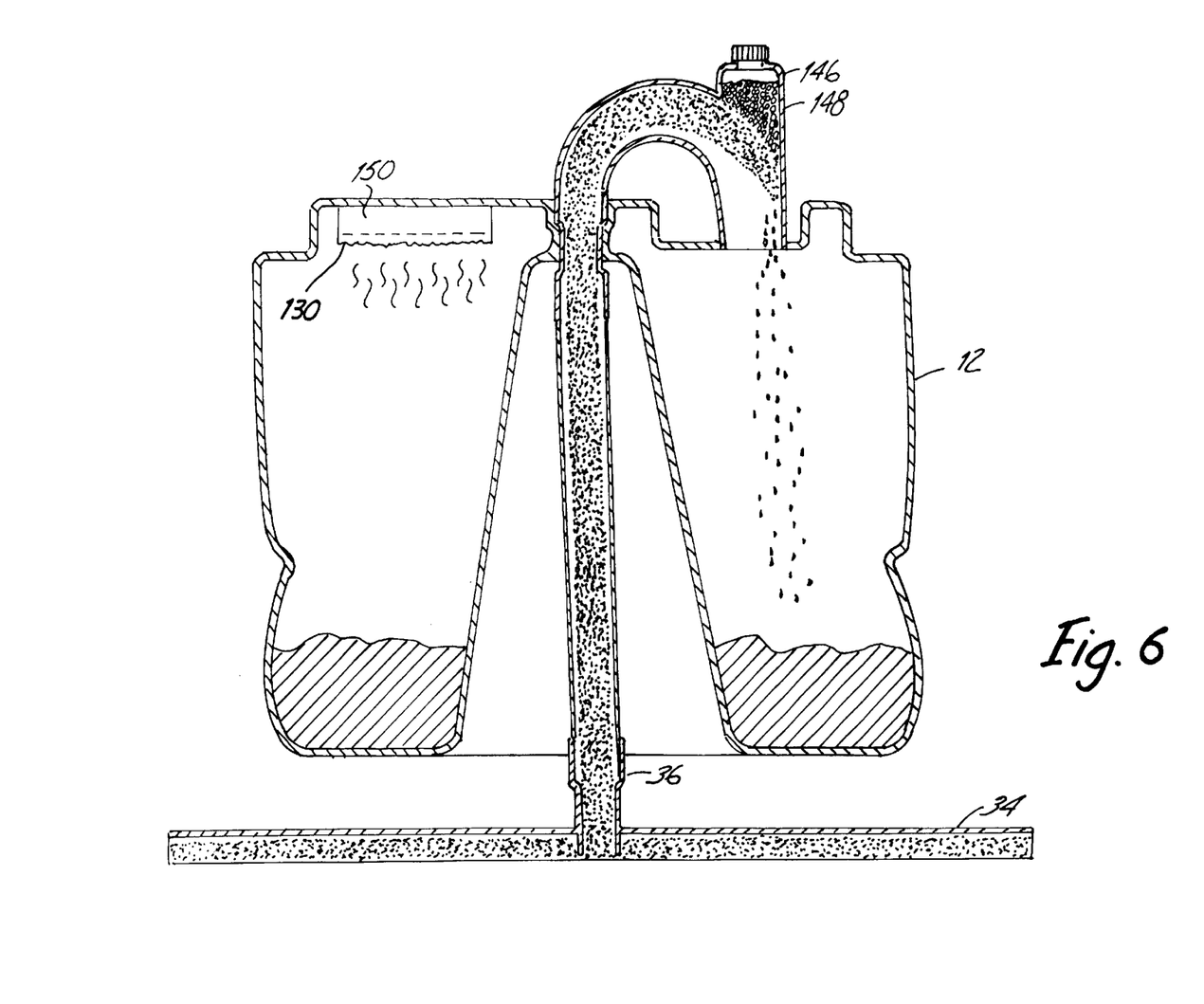
FIG. 6 is a cross sectional view of yet another embodiment of a scrubber similar to that of FIGS. 1–4.

The scrubber 10 may include a defoaming device or system to reduce the volume of the collected soiled solution. The defoaming device or system may be part of the soiled solution collection and handling device 32 or may be disposed in relation to the soiled solution tank 12. The defoaming device or system may include a chemical defoaming system for applying a defoaming chemical to collected foam. The defoaming device may include an acoustic and/or mechanical defoaming device. FIG. 6 illustrates one particular defoaming device 146 for use with the scrubber of FIGS. 1–4. FIG. 6 is a cross sectional view taken through the recovery tank 12, vacuum conduit 36, and vacuum squeegee 34. The defoaming device 146 may be an selective device finding applicability in high foam situations. Foam lifted from the squeegee 34 through vacuum conduit 36 is passed by the defoaming device 146 containing a defoaming chemical 148. The defoaming device 146 is a passive device allowing the chemical 148 to passively interact with the recovered foam. The defoaming device 146 may have a porous or apertured element for promoting contact between the defoaming chemical or defoamant 148 and the recovered foam. One particular defoamant which may be used is FOAM-OUT™ manufactured by LaPorte Water Technologies, Inc., of Alpharetta, Ga. Alternative defoaming devices or defoamants may also be practicable.

Another defoaming device is illustrated in FIG. 5 and FIG. 6 as numeral 130. Defoaming device 130 is a radiant heating element disposed above the soiled solution in the recovery tank 12. Radiant heating element 130 may be an electric heating element powered by the batteries 46, or may be powered by another heat source, such as propane or recovered heat from an IC engine. Radiant heating element 130 functions to de-aerate foam within the solution tank 12 via a thermal process. One or more radiant heating elements 130 may be utilized in embodiments of the present invention.

Additional aspects of the present invention will be addressed. Regarding the foam system, alternative foam generation systems may be practicable. In the above described embodiment, a compressed air and pressurized cleaning liquid process is utilized. Other means for generating the foam-like aerated cleaning liquid may utilize known foam generating devices. One or more known foam generating devices may be used to generate the foam-like aerated cleaning liquid for use in a scrubbing operation as described herein.

Foam generation devices utilizing an agitation process are known. An agitation process uses a mechanical device, such as a rotating impeller, to engage and entrain air within a solution. U.S. Pat. Nos. 3,761,987 and 3,931,662 each disclose an agitation-type foam generator, the disclosures of which are incorporated by reference herein.

Foam generation devices utilizing a pressurized liquid process are also known. These devices include foam generating nozzles such as for use in fire fighting equipment. Ambient air may be aspirated into a solution at the nozzle end of a hose by an air-aspirating nozzle. Aspirated foam systems do not use compressed gases to create the foam. A mixture of foam concentrate and water is pumped through a special aspirating nozzle located at the end of the delivery hose. This special nozzle is designed to draw in atmospheric air and mix it with the foam concentrate-water mix to create foam.

Foam generation devices utilizing a pressurized gas process are also known. A method of expanding the volume of a solution into foam is to introduce compressed air into the solution prior to the solution reaching a nozzle. Compressed gas, usually air, is introduced into the foam concentrate-water mixture at high pressure, usually in the range of 60–100 psi. The air is mixed with the foam concentrate-water mixture either with an active mixing device or a passive mixing device which can be as simple as a long length of conduit.

Figure 7:
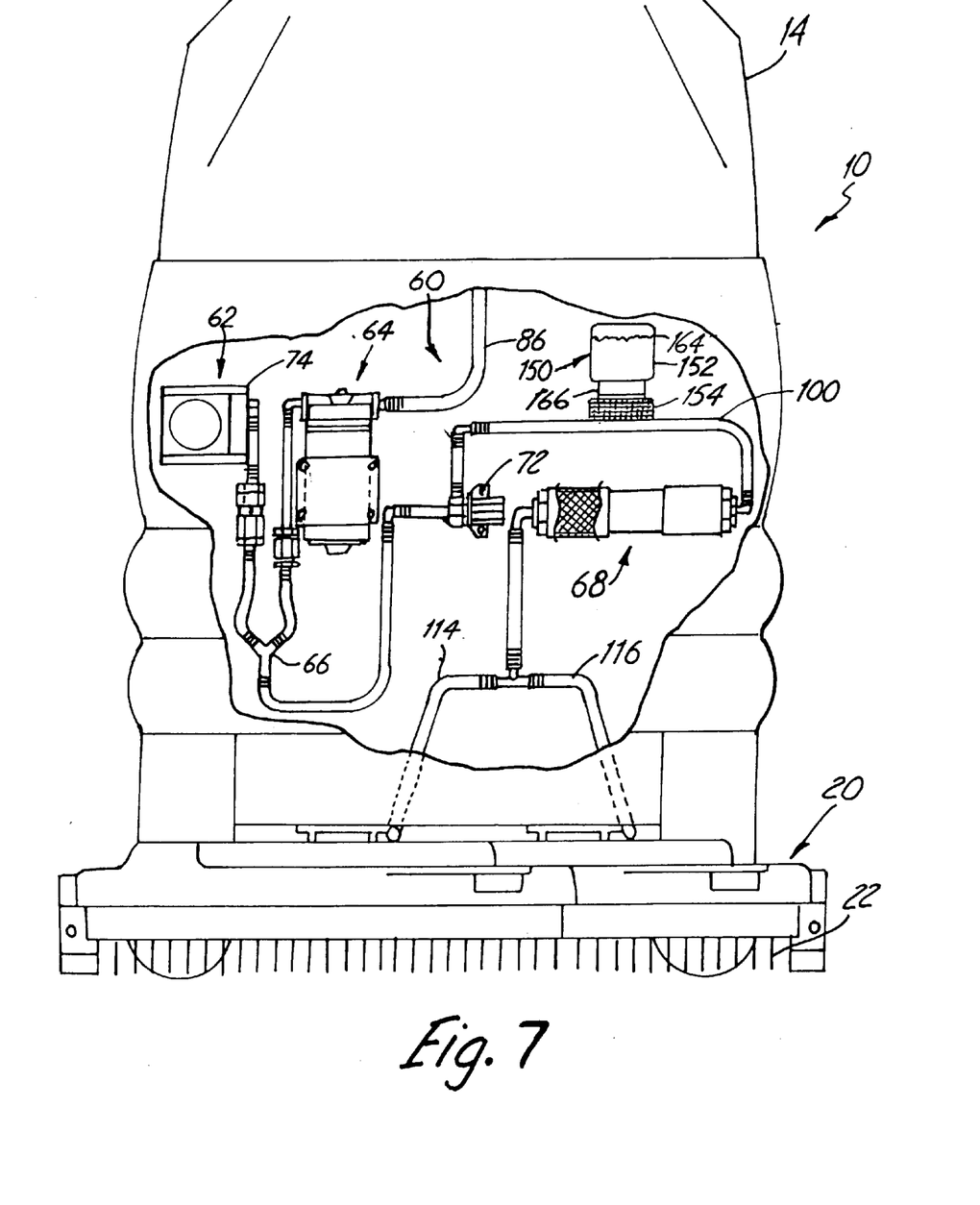
FIG. 7 is a detailed front elevation view of another embodiment of a cleaning liquid aeration system according to the present invention.
Figure 8:
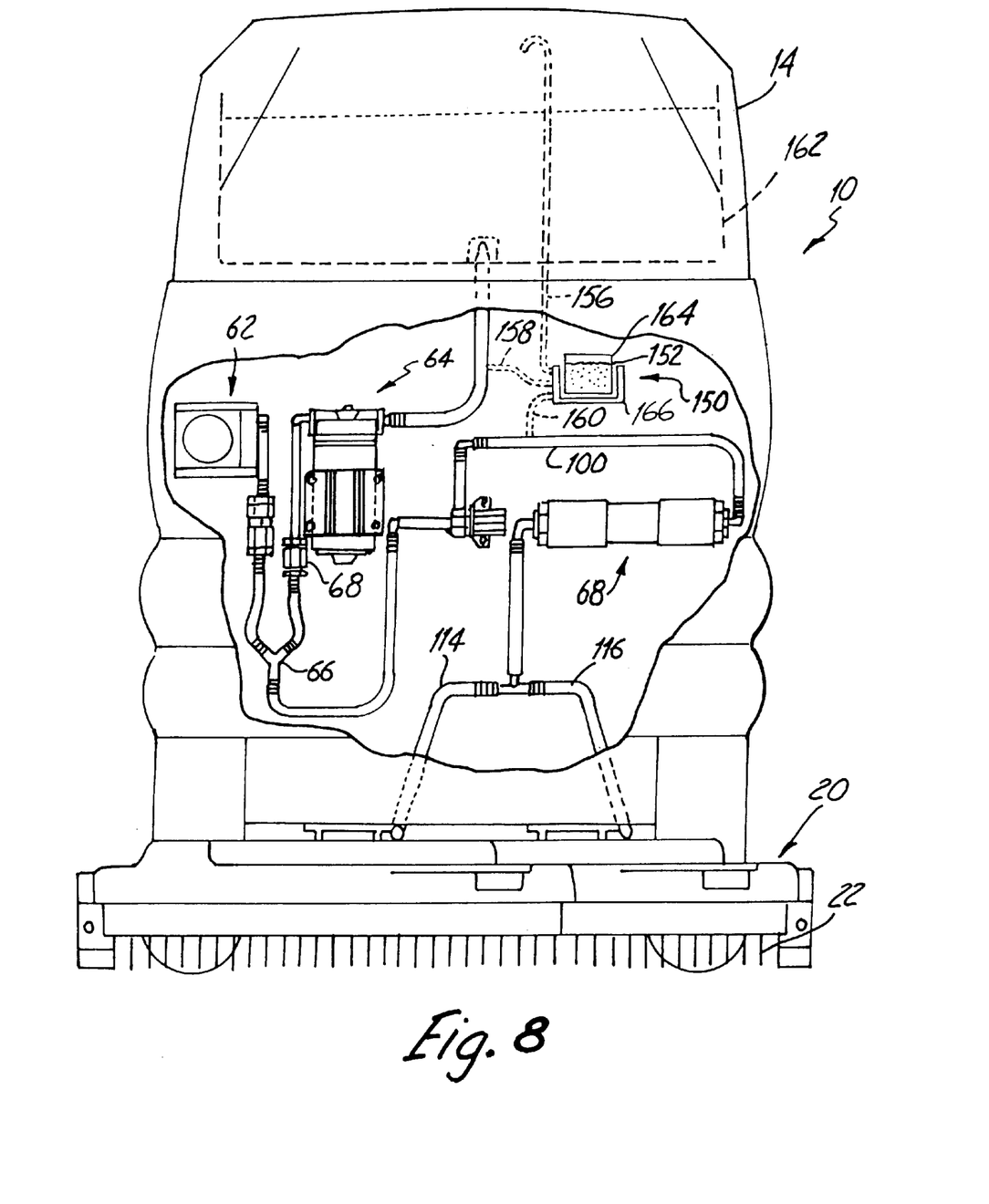
FIG. 8 is a detailed front elevation view of another embodiment of a cleaning liquid aeration system according to the present invention.

Referring to FIGS. 7 and 8, an additional chemical dispenser aspect of the present invention is disclosed. Illustrated as numeral 150, a chemical dispenser may be utilized to combine water and the surfactant to form the cleaning liquid. The term "dispenser" as used herein is broadly meant to include devices or systems for providing, distributing, releasing, injecting, conveying, and/or dosing a chemical or chemicals into a solution to create the cleaning liquid. A variety of chemical dispensers would be appreciated by those skilled in the relevant arts. A chemical dispenser is particularly well suited for a scrubber according to the present invention given the relatively small amount of surfactant needed to form an aerated cleaning liquid. The chemical dispenser 150 may include active and/or passive elements. A passive element chemical dispenser is illustrated in FIG. 7, wherein the surfactant 152 is permitted to diffuse through a porous medium 154 and into conduit 100. An active element chemical dispenser is illustrated in FIG. 8, wherein the surfactant 152 is pumped through one or more conduits 156, 158, 160 for mixing with water. In one embodiment, chemical dispenser 150 may dispense the chemical to a water tank 162 via conduit 156 for mixing with a predetermined volume of water, such as during refilling. In another embodiment, chemical dispenser 150 may dispense the chemical via lines 158 and/or 160 for mixing within the associated conduits to generate the cleaning liquid.

Yet another aspect of the chemical dispenser 150 is the provision of a removable cartridge 164 containing the surfactant 152 and/or other chemicals. The term "cartridge" as used herein is broadly meant to include structures for holding a chemical, including but not limited to sealed or unsealed tanks, bottles, vessels, and other containers. The cartridge 164 may be specifically adapted to engage a retaining structure 166 on the machine 10. A variety of cartridges 164 and retaining structures 166 would be appreciated by those skilled in the relevant arts. The chemical dispenser 150 may include one or more disposable chemical cartridges 164. A family of chemical cartridges 164 may be provided, each member of the family having a different predetermined surfactant and/or chemical contained therein. For example, a first chemical cartridge 164 may include a surfactant and other chemicals (such as disinfectants, solvents, alkaline builders, etc.) specifically adapted for a heavily soiled surface, with a second chemical cartridge 164 being adapted for lightly soiled surface.

Distribution of the aerated cleaning liquid may include alternative structures. For example, the aerated solution may be sprayed on the hard floor surface or brushes 22 or both. The aerated solution may be delivered through the brushes 22, such as via apertures in the brush 22, and/or applied directly to the floor surface in front of the brushes 22. Distribution of aerated cleaning liquid may include a selective application to the hard floor surface, the brushes, or both. Alternative distribution systems may be appreciated by those skilled in the relevant art.

As various changes could be made in the above methods without departing from the scope of the invention, it is intended that all matter contained in the above description or shown in the accompanying drawings shall be interpreted as illustrative and not in a limiting sense.

What is claimed is:

1. A method of cleaning a hard floor surface with a surface maintenance vehicle, said method comprising the steps of:
    generating a foamed cleaning liquid;
    wetting the hard floor surface with the foamed cleaning liquid;
    scrubbing the hard floor surface with a rotating scrubbing medium and said foamed cleaning liquid so as to loosen soil from the hard floor surface leaving behind a soiled solution of cleaning liquid and soil; and
    removing at least a portion of the soiled solution from the hard floor surface through a fluid recovery device.

2. The method of claim 1 wherein the scrubbing medium is a cylindrical-type scrub brush rotating about a generally horizontal axis of rotation and generally transverse to an operating direction of movement of said surface maintenance vehicle.

3. The method of claim 1 wherein the step of generating the foamed cleaning liquid is selectively achieved by way of an air compression process, an agitation process, or both.

4. The method of claim 1 wherein the step of generating the foamed cleaning liquid is achieved by way of a process utilizing compressed air and pressurized cleaning liquid.

5. The method of claim 1 wherein the step of removing soiled solution from the hard floor surface is achieved via a non-vacuum process.

6. The method of claim 5 wherein the non-vacuum process includes the steps of:
    physically wiping the hard floor surface with a wiping medium;
    lifting soiled solution away from the hard floor surface; and
    depositing the soiled solution in a recovery tank.

7. The method of claim 1 wherein the step of selectively conveying the foamed cleaning liquid to the hard floor surface and the scrub brush includes the step of selectively applying the foamed cleaning liquid directly to the floor surface and directly to the scrubbing medium.

8. The method of claim 1 wherein the cleaning liquid is selected such that the foamed cleaning liquid substantially de-aerates on the hard floor surface prior to removal of the soiled solution.

9. The method of claim 1 wherein the cleaning liquid is provided through a step of mixing water with a surfactant within a solution tank.

10. The method of claim 1 wherein the cleaning liquid is provided through a step of mixing water with a surfactant dispensed from a chemical dispenser.

11. The method of claim 10 wherein the chemical dispenser includes a removable cartridge element containing said surfactant.

12. The method of claim 1 further comprising the step of defoaming soiled solution recovered by the fluid recovery device via a chemical or thermal device.

13. A method of cleaning a hard floor surface comprising the steps of:
    generating a foamed cleaning liquid by mixing pressurized air with a cleaning liquid;
    wetting the hard floor surface with the foamed cleaning liquid;
    scrubbing the hard floor surface with a scrubbing medium and said foamed cleaning liquid so as to loosen soil from the hard floor surface leaving behind a soiled solution of cleaning liquid and soil; and
    removing at least a portion of the soiled solution from the hard floor surface through a fluid recovery device.

14. The method of claim 13 wherein the step of scrubbing the hard floor surface is achieved by rotating or oscillating the scrubbing medium relative to the hard floor surface.

15. The method of claim 13 wherein the scrubbing medium is a cylindrical-type scrub brush rotating about a generally horizontal axis of rotation and generally transverse to an operating direction of movement of said surface maintenance vehicle.

16. The method of claim 13 wherein the step of removing soiled solution from the hard floor surface is achieved via a non-vacuum process.

17. The method of claim 16 wherein the non-vacuum process includes the steps of:
    physically wiping the hard floor surface with a wiping medium;
    lifting soiled solution away from the hard floor surface; and
    depositing the soiled solution in a recovery tank.

18. The method of claim 13 wherein the step of selectively conveying the foamed cleaning liquid to the hard floor surface and the scrubbing medium includes the step of selectively applying the foamed cleaning liquid directly to the floor surface and directly to the scrubbing medium.

19. The method of claim 13 wherein the cleaning liquid is selected such that the foamed cleaning liquid substantially de-aerates on the hard floor surface prior to removal of the soiled solution.

20. The method of claim 13 wherein the step of generating the foamed cleaning liquid includes the step of mixing pressurized air with pressurized cleaning liquid.

21. The method of claim 20 wherein the step of mixing pressurized air with pressurized cleaning liquid is achieved via one or more passive mixing elements.

22. The method of claim 13 wherein the cleaning liquid is provided through a step of mixing water with a surfactant within a solution tank.

23. The method of claim 13 wherein the cleaning liquid is provided through a step of mixing water with a surfactant dispensed from a chemical dispenser.

24. The method of claim 23 wherein the chemical dispenser includes a removable cartridge element containing said surfactant.

25. The method of claim 13 further comprising the step of defoaming soiled solution recovered by the fluid recovery device via a chemical or thermal device.

26. A method of cleaning a hard floor surface comprising the steps of:

generating a foamed cleaning liquid;

wetting the hard floor surface with the foamed cleaning liquid;

scrubbing the hard floor surface with a scrubbing medium and said foamed cleaning liquid so as to loosen soil from the hard floor surface leaving behind a soiled solution of cleaning liquid and soil; and non-vacuumized transporting at least a portion of the soiled solution from the hard floor surface and into the recovery tank.

27. The method of claim 26 wherein the step of generating the foamed cleaning liquid is selectively achieved by way of an air compression process, an agitation process, or both.

28. The method of claim 26 wherein the step of generating the foamed cleaning liquid is achieved by way of a process utilizing compressed air and pressurized cleaning liquid.

29. The method of claim 26 wherein the step of scrubbing the hard floor surface is achieved by rotating or oscillating the scrubbing medium relative to the hard floor surface.

30. The method of claim 26 wherein the scrubbing medium is a cylindrical-type scrub brush rotating about a generally horizontal axis of rotation and generally transverse to an operating direction of movement of said surface maintenance vehicle.

31. The method of claim 26 wherein the step of non-vacuumized transporting the soiled solution includes the steps of:

physically wiping the hard floor surface with a wiping medium;

lifting soiled solution away from the hard floor surface; and depositing the soiled solution in a recovery tank.

32. The method of claim 26 wherein the cleaning liquid is selected such that the foamed cleaning liquid substantially de-aerates on the hard floor surface prior to removal.

33. The method of claim 26 wherein the cleaning liquid is provided through a step of mixing water with a surfactant within a solution tank.

34. The method of claim 26 wherein the cleaning liquid is provided through a step of mixing water with a surfactant dispensed from a chemical dispenser.

35. The method of claim 34 wherein the chemical dispenser includes a removable cartridge element containing said surfactant.

36. The method of claim 26 further comprising the step of defoaming soiled solution recovered by the fluid recovery device via a chemical or thermal device.

* * * * *